United States Patent
Zachmann

[15] 3,679,267
[45] July 25, 1972

[54] SPARE WHEEL FOR AUTOMOBILE

[72] Inventor: Octave B. Zachmann, 7531 Angeline Drive, New Hope, Minn. 55428

[22] Filed: Aug. 14, 1970

[21] Appl. No.: 63,771

[52] U.S. Cl. .........................................................301/38 R
[51] Int. Cl. ...........................................................B60b 11/00
[58] Field of Search ................301/38 R, 38, 39 R, 39 C, 47; 152/216

[56] References Cited

UNITED STATES PATENTS

| | | | |
|---|---|---|---|
| 1,854,636 | 4/1932 | Westbrook | 301/38 R |
| 1,823,660 | 9/1931 | Nehin | 301/38 T |
| 2,257,543 | 9/1941 | Toby | 301/39 R |
| 3,016,078 | 1/1962 | Schmidt | 152/216 |
| 3,295,894 | 1/1967 | Perry | 301/38 R |

FOREIGN PATENTS OR APPLICATIONS

| | | | |
|---|---|---|---|
| 351,119 | 6/1931 | Great Britain | 301/38 S |

*Primary Examiner*—Richard J. Johnson
*Attorney*—Merchant & Gould

[57] ABSTRACT

A spare wheel for automobiles which removably attaches to the wheel of a flat tire and permits movement of the vehicle without fixing or removing the tire. The spare wheel comprises a pair of rigid wheel segments of unequal size which are pivotally connected and together form a wheel having a diameter at least as great as the tire. The smaller segment pivots outwardly to permit attachment of the unit to the wheel of the flat tire, after which the vehicle is advanced until the segments can be returned to the wheel forming position. The edge of the first segment which is common with the second segment is arcuately shaped to permit it to roll in either direction notwithstanding composition of the road surface.

9 Claims, 7 Drawing Figures

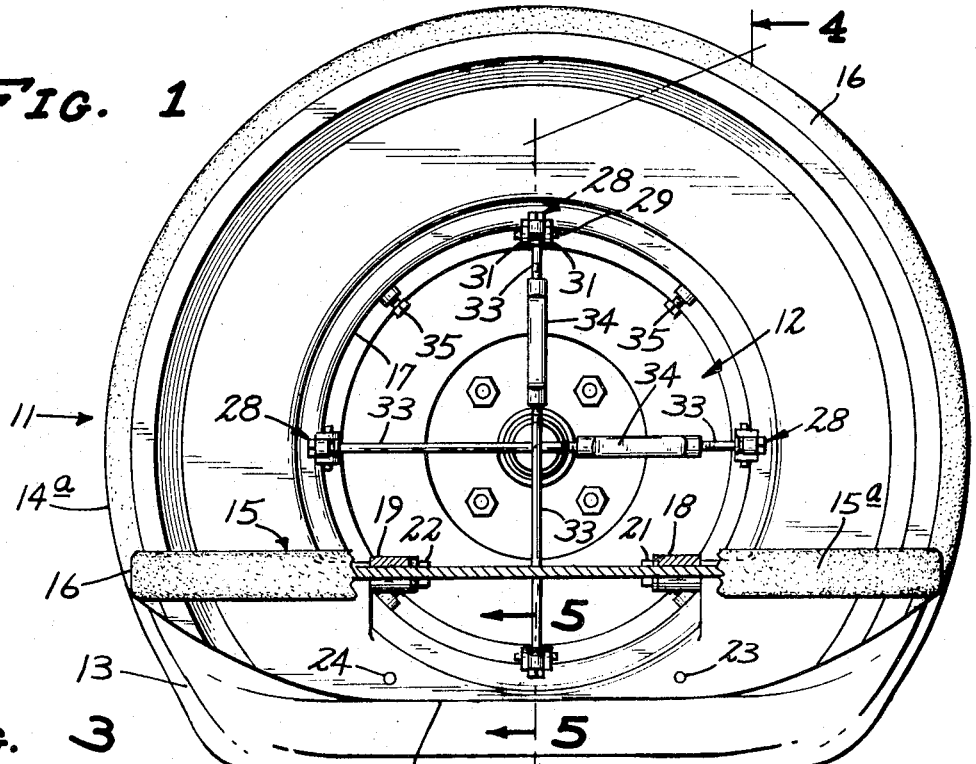
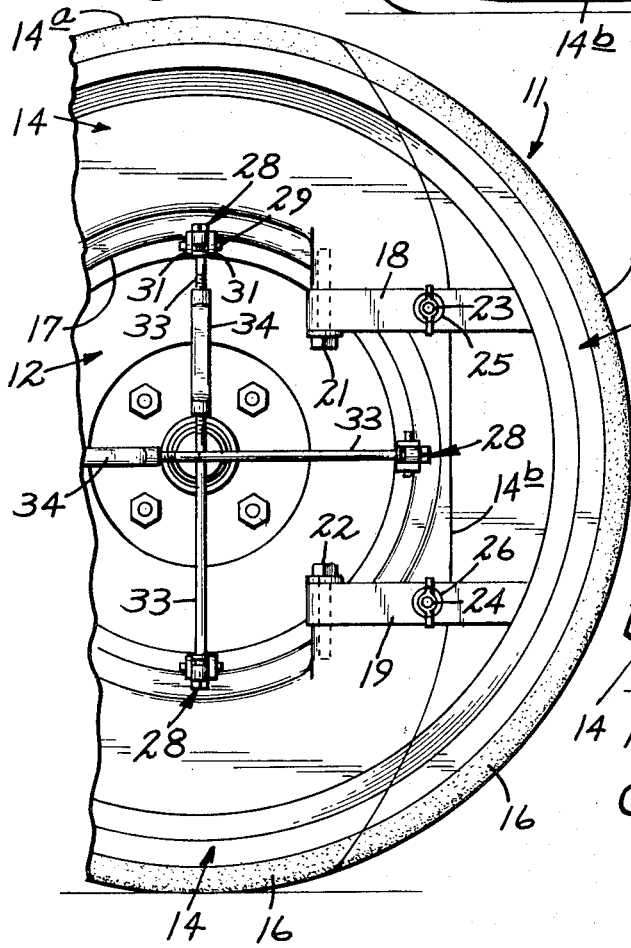
FIG. 1
FIG. 2
FIG. 3
INVENTOR.
OCTAVE B. ZACHMANN
BY
Merchant & Gould
ATTORNEYS

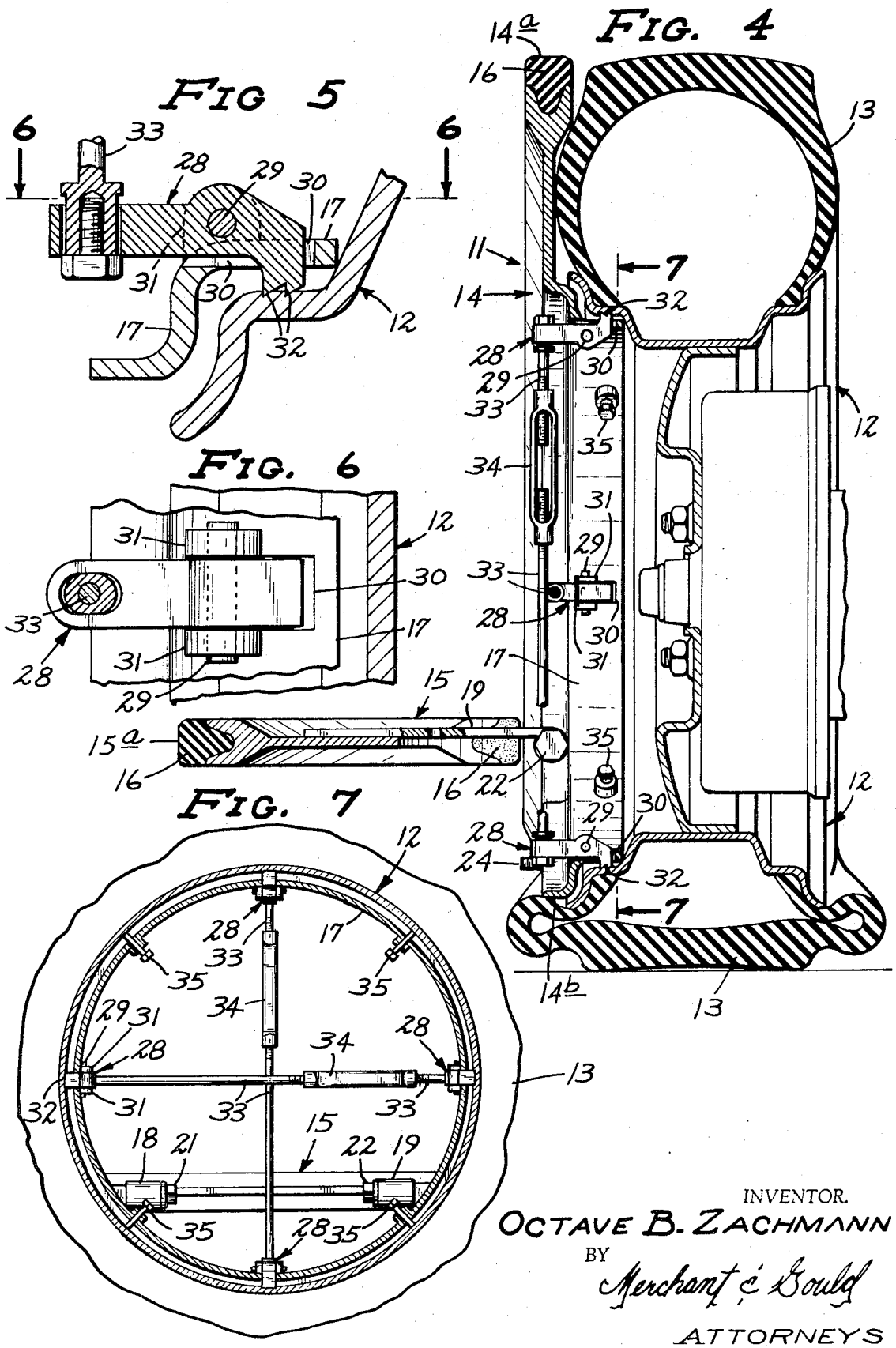

SPARE WHEEL FOR AUTOMOBILE

The invention is related to spare wheels which attach directly to the wheel of a flat tire and offer rolling support to the vehicle.

Wheels of this type offer a tremendous advantage to the motorist having a flat tire, since there is no need to jack up the car, and to remove and replace the defective tire.

Devices of this general type are not new. For example, see U.S. Pat. No. 1,823,660 issued to Harry E. Nehin on Sept. 15, 1931, and U.S. Pat. No. 2,535,567, issued to Edward Craig on Dec. 26, 1950. I have found that on relatively soft road surfaces the device disclosed in the Nehin patent is extremely useful when flat tires are encountered, and is an excellent substitute for the conventional car jack, a fifth pneumatic tire and the back breaking chores related thereto.

However, I have also found that the average motorist does not have a flat tire or blow out on relatively soft road surfaces. Instead, tire trouble is much more likely to occur during high speed driving on hard road surfaces such as those found on freeways.

The Nehin device comprises a pair of rigid wheel segments of unequal size that are pivotally connected to form a wheel. The smaller segment pivots outward to decrease the overall diameter of the device and permit its attachment to the wheel of a flat tire. The vehicle is then rolled forward or backward until the larger segment supports the vehicle, at which time the smaller segment is returned to its wheel forming position. When attached to a non-driving wheel (usually a front wheel) of a vehicle, the Nehin device operates poorly or not at all because the straight segmented surface of the larger segment lies flat on the ground and merely slides along the ground surface when the vehicle is advanced.

My invention overcomes this disadvantage by providing pivotally connected rigid wheel segments of unequal size wherein the larger segment has an arcuately shaped segmented surface. This edge insures that the spare wheel will roll onto its wheel surface notwithstanding composition of the road or the direction of vehicular movement.

I also provide connecting means for quickly and easily attaching the spare wheel to and removing it from the wheel of a flat tire.

BRIEF DESCRIPTION OF THE DRAWINGS

FIG. 1 is a side elevation of a spare wheel embodying the inventive principle as attached to the wheel of a flat tire, the overall combination being shown in a first position;

FIG. 2 is a side elevation of the spare wheel and tire in a second position;

FIG. 3 is a side elevation of the spare wheel and tire in a third position;

FIG. 4 is a sectional view of the spare wheel and tire, taken generally along the line 4—4 of FIG. 1;

FIG. 5 is a sectional view of means for connecting the spare wheel to the tire, taken generally along the line 5—5 of FIG. 1;

FIG. 6 is a sectional view of the connecting means taken generally along the line 6—6 of FIG. 5; and FIG. 7 is a sectional view of the overall connecting means taken along the line 7—7 of FIG. 4.

DESCRIPTION OF THE PREFERRED EMBODIMENT

In FIG. 1, a spare wheel embodying the inventive principle and represented generally by the numeral 11 is shown attached to a wheel or hub 12 of a flat tire 13. Wheel 11 comprises a first rigid wheel segment 14 having a partial road engaging wheel surface 14a and a segmented surface 14b, and a second rigid wheel segment 15 having partial road engaging surface 15a. Wheel segments 14 and 15 together form a full vehicle wheel which is capable of offering temporary rolling support to a vehicle. Segmented surface 14b is arcuately formed to permit rolling movement of the vehicle, as described more fully below.

As best seen in FIG. 4, the outer peripheral edge of both segments 14 and 15 is grooved to receive a solid but resilient rubber member 16 which serves as a temporary tire. The overall diameter of spare wheel 11 with rubber tire member 16 in place is at least as great as, and preferably slightly greater than, the diameter of tire 13 in an inflated state.

A circumferential flange 17 projects from the inner peripheral edge of wheel segment 14 to form a hub which is sized to fit the inside recess of wheel 12. Flange 17 can be removably attached to wheel 12, and described in further detail below.

Wheel segments 14 and 15 are pivotally connected by a pair of straps 18, 19 which, as shown in FIG. 3, are rigidly affixed at one end to the face of wheel segments 15. The opposite ends of straps 18, 19 are looped and rotatably mounted on a pair of colinear bolts 21, 22, which are rigidly affixed to wheel segment 14. This structure permits wheel segment 15 to be pivoted away from and out of the plane of wheel segment 14 to simplify attachment of spare wheel 11 to wheel 12. Wheel segment 15 is held in the wheel forming position as shown in FIG. 3 by a pair of threaded stud members 23, 24 which are affixed to wheel segment 14 and project through openings in the respective straps 18, 19. Wing nuts 25, 26 screw on stud members 23, 24 to prevent wheel segment 15 from moving out of its wheel forming position.

As shown in FIGS. 5 and 6, flange 17 carries a plurality of elongated fasteners 28 which are constructed and arranged to engage wheel 12 and thereby enable spare wheel 11 to remove the load from flat tire 13. In the preferred embodiment there are four equidistantly spaced fasteners 28, each being mounted for pivotal movement in an opening 30 formed in flange 17. This pivotal mounting comprises a pin 29 which is affixed to flange 17 by ears 31.

As best shown in FIG. 6, the inner end of fastener 28 includes a plurality of teeth 32 which engage and bite into the surface of wheel 12. As best shown in FIG. 4, the outer end of each fastener 28 is operably connected to a diametrically opposed fastener 28 by a pair of threaded rods 33 and a turnbuckle 34. Thus, the rotation of turnbuckle 34 can cause the inner end of fastener 28 to move either radially inward and away from wheel, or radially outward so that teeth 32 engage wheel 12.

Flange 17 also may carry a plurality of spaced and adjustable threaded members 35, which serve to properly center spare wheel 11 in the recess of wheel 12.

In the event of a flat tire as indicated by the numeral 13, spare wheel 11 is attached to wheel 12 by initially swinging wheel segment 15 outward and moving hub 17 into a centered position within the recess of wheel 12 (FIGS. 1 and 4) with segmented surface 14b down. Turnbuckles 34 are then rotated to draw the outer ends of fasteners 28 radially inward, thereby forcing the inner ends and teeth 32 radially outward into biting engagement with the inner surface of wheel 12.

At this point the vehicle is still supported by the flat tire since segmented surface 14b does not touch the road. The vehicle is now moved either forward or backward, which brings segmented surface 14b into engagement with the road surface (FIG. 2). By virtue of the arcuate shape of surface 14b, the vehicle easily rolls upward and onto partial wheel surface 14a. In this position, wheel segment 15 can be moved to its wheel forming position with threaded stud members 23, 24 projecting through the openings in straps 18, 19, respectively. Wing nuts 25 and 26 are then screwed on stud members 23 and 24 to hold wheel segment 15 in the wheel forming position, and the automobile may thereafter be driven until the tire can be repaired.

What is claimed is:

1. A spare wheel for a vehicle supported by pneumatic tires mounted on rigid wheels, comprising:
    a first rigid wheel segment having a partial road engaging wheel surface and a segmented surface;
    a second rigid wheel segment having a partial road engaging wheel surface and cooperable with the first wheel segment to form a vehicle supporting wheel having an essentially complete wheel surface;

means for connecting the first and second wheel segments in hinging relation to permit the second wheel segment to be rotated out of the plane of the first wheel segment;

means for releasably fastening the first wheel segment to one of said vehicle wheels, comprising a plurality of elongated fastening members, each fastening member having first and second ends and being pivotally connected intermediate said end to the first wheel segment to permit radial outward movement of the first end into engagement with the inner face of a vehicle wheel;

and actuating means for rotating each fastening member to effect engagement of the first end thereof with the vehicle wheel; the segmented surface being arcuately shaped to permit said vehicle to roll thereon;

and means for releasably holding the second wheel segment in the plane of the first wheel segment.

2. The spare wheel as defined by claim 1, wherein the first wheel segment is larger than the second wheel segment.

3. The spare wheel as defined by claim 1, wherein the partial wheel surfaces of the first and second wheel segments are resilient.

4. The spare wheel as defined by claim 1, wherein the fastening members are arranged in diametrically opposed pairs, and the actuating means comprises:

a threaded rod connected to the second end of each fastening member of the pair and projecting toward the opposed fastening member;

and a turnbuckle operatively connecting the threaded rods.

5. The spare wheel as defined by claim 1, wherein the diameter of the spare wheel is at least as great as the diameter of a pneumatic tire.

6. The spare wheel as defined by claim 1, wherein the means for connecting the first and second wheel segments comprises:

first and second rigid straps each of which has a portion affixed to the second wheel segment with an end projecting therefrom;

and first and second stud members projecting from the first wheel segment in colinear relation;

the ends of the first and second rigid straps having bearing portions respectively received by the first and second stud members.

7. The spare wheel as defined by claim 4, wherein an opening is formed in each of the rigid straps, and the holding means comprises:

first and second threaded members affixed to the first wheel segment and disposed to project through the respective openings in the first and second straps upon movement of the second wheel segment into the plane of the first wheel segment;

and a threaded nut for each threaded member.

8. The spare wheel as defined by claim 1, wherein the first wheel segment further comprises a hub portion sized for insertion into the recess of a vehicle wheel, the releasable fastening means being disposed on the hub portion.

9. The spare wheel as defined by claim 6, and further comprising a plurality of adjustable members for centering the hub portion in the vehicle wheel recess.

* * * * *